(12) United States Patent
Batenburg et al.

(10) Patent No.: US 8,586,123 B2
(45) Date of Patent: Nov. 19, 2013

(54) FOOD COMPOSITION

(75) Inventors: Amir Maximiliaan Batenburg, Vlaardingen (NL); Robert Jan Van Der Velden, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 220 days.

(21) Appl. No.: 12/663,109

(22) PCT Filed: Jun. 2, 2008

(86) PCT No.: PCT/EP2008/056748
§ 371 (c)(1),
(2), (4) Date: Apr. 1, 2010

(87) PCT Pub. No.: WO2008/148724
PCT Pub. Date: Dec. 11, 2008

(65) Prior Publication Data
US 2010/0209561 A1    Aug. 19, 2010

(30) Foreign Application Priority Data
Jun. 7, 2007   (EP) .................................... 07109810

(51) Int. Cl.
*A23L 1/22*   (2006.01)
(52) U.S. Cl.
USPC .............. 426/649; 426/74; 426/650; 426/652
(58) Field of Classification Search
USPC ..................... 426/74, 649, 650, 652
See application file for complete search history.

(56) References Cited

U.S. PATENT DOCUMENTS 4,139,649 A    2/1979   Mussinan et al.

FOREIGN PATENT DOCUMENTS

| EP | 1 425 977 A | 6/2004 |
|---|---|---|
| GB | 1 395 843 A | 5/1975 |
| JP | 2005015684 A | 1/2005 |
| WO | 01/84959 A | 11/2001 |

OTHER PUBLICATIONS

Djordevic, et al., Exp Brain Res(2004) 159: 405-408.
Grosch, et al., J. Agric. Food Chem. 1994, 42, 2862-2866.
EP Search Report published in priority application, EP 07 10 9810, Nov. 15, 2007, 3 pp.
Intetnational Search Report published in corresponding WO 2008/146724, PCT/EP2008/056748, 2 pp.
XP002458717 & JP 2005 348628 A (Ajinomoto KK), Dec. 22, 2005, abstract.
XP002458718 & RU 2 087 105 C1 (as Russia Food Products Inst), Aug. 20, 1997, abstract.
XP002458719 & JP 51 148072 A (Kikkoman Shoyu Co. Ltd.), Dec. 17, 1976, abstract.

*Primary Examiner* — Helen F Heggestad
(74) *Attorney, Agent, or Firm* — Alan A. Bornstein

(57) ABSTRACT

The present invention relates to the use of the compounds a) 3-hydroxy-2(H)-furanones, preferably, 3-hydroxy-4,5-di-alkyl-2(H)furanones, b) thiol-substituted methylfuranes, thiol-substituted methyl di/tetra-hydro furanes, or dithiolanes, preferably furfurylthiol, 2-methyl-3-tetrahydrofuranthiol or 2-methyl-1,3-dithiolane, c) furfuryl alcohol, d) bis(2-methyl-3-furanyl)disulphide as a sodium-replacing agent in food compositions. Furthermore, the invention relates to a ready-to-eat and a concentrated food composition which may comprise less sodium than conventional comparable ready-to-eat or concentrated food compositions, respectively, but which food compositions are experienced by the consumer as having a flavor which is comparably salty as that of a conventional comparable composition. Furthermore, the present invention relates to a method to reduce the sodium content of a food composition by replacing sodium by the above mentioned compounds.

3 Claims, No Drawings

FOOD COMPOSITION

The present invention relates to the use of specific compounds as a salt replacing agent in food compositions. It further relates to a ready-to eat and a concentrated food composition comprising any of these compounds. It further relates to a method to reduce the Na$^+$ content of a food composition.

Many conventional food compositions comprise ingredients to enrich or to enhance the taste of the food composition. In addition, it is common use, when preparing food, to add several taste-enriching and/or taste-enhancing ingredients to it. These ingredients may also be added, at least part of it, when the food has been prepared and is ready to be consumed. These taste-enriching or taste-enhancing ingredients may comprise among others salt, monosodium glutamate, and specific herbs and spices in balanced amounts. Their respective amounts may depend on e.g. the type of food composition (e.g. ready to eat, instant, concentrated) and/or local and/or personal preferences.

From the many possible tastes to be added by taste-enriching and/or taste-enhancing ingredients, a salty taste is in many cases desired in many food compositions, especially in savoury food compositions. Savoury food compositions may comprise e.g. bouillons, sauces, soups, seasonings, meals and meal kits.

A conventional ingredient used to add a salty taste to a food composition is common salt, i.e. NaCl. When dissolved, salt crystals fall apart into ions. These ions interact with receptor cells on the tongue to trigger a reaction which may be experienced by the consumer as a salty taste.

Sodium salts, however, may show some disadvantages. Sodium is considered to be unhealthy for consumers as it would be involved in e.g. increased blood pressure, especially when consumed in relatively high amounts or when the consumer belongs to a risk group, such as patients suffering from heart failure. To meet this shortcoming of sodium salts, several salts are known in the art to replace them, reducing the need for sodium in food compositions, but still providing a salty taste to them. Examples of such sodium-replacing salts are e.g. lower alkaline metal-salts other than sodium salts, such as MgCl, or KCl, or a salt such as NH$_4$Cl. A disadvantage, however, may be that several salts commonly used to replace NaCl may provide a metallic or bitter off-taste. In many food applications such an off-taste is not desired.

Djordjevic, J. et al., Exp Brain Res (2004) 159: 405-408, disclose that the perceived saltiness of weak sodium chloride solutions may be enhanced by the odour of soy sauce, as perceived by test persons. A disadvantage, however, of the use of soy sauce is that it may not be incorporated in all food compositions without changing the taste of these food compositions.

Therefore, the object of the present invention is to provide compounds that can be used as a sodium-replacing agent, to provide a salty flavour to food compositions. Furthermore, it is an object to provide a method to provide a salty flavour to food compositions, but in which less sodium is used compared to a conventional method. Furthermore, it is an object to provide a ready-to-eat and a concentrated food composition which may comprise less sodium, than conventional comparable ready-to-eat or concentrated food compositions, respectively, but which food compositions are experienced by the consumer as having a flavour which is comparably salty as that of a conventional comparable composition. The compounds applied in the invention should be applicable, with respect to flavour, in a broad range of food compositions and preferably not provide an off-taste, such as e.g. metallic bitterness.

SUMMARY OF THE INVENTION

Accordingly, the present invention relates to the use of at least one compound selected from:
a) 3-hydroxy-2(H)-furanones, preferably, 3-hydroxy-4,5-dialkyl-2(H)furanones,
b) thiol-substituted methylfuranes, thiol-substituted methyl di/tetra-hydro furanes, or dithiolanes, preferably furfurylthiol, 2-methyl-3-tetrahydrofuranthiol or 2-methyl-1,3-dithiolane,
c) furfuryl alcohol,
d) bis(2-methyl-3-furanyl)disulphide,
as a sodium replacing agent in food compositions, wherein said at least one compound is added to a food composition during and/or after preparation of said food composition in a total amount of from at least more than 2 ppb, preferably more than 5 ppb, more preferably more than 10 ppb, most preferably more than 20 ppb and less than 1000 ppb, preferably less than 500 ppb, more preferably less than 200 ppb, most preferably less than 100 ppb, based on the weight of said food composition.

DETAILED DESCRIPTION IF THE INVENTION

Within the content of this specification, "sodium" is intended to mean "sodium ions", also indicated as Na$^+$.

"Food composition" is intended to comprise both ready-to-eat food compositions and concentrated food compositions, when not otherwise specified.

"Ready-to-eat food composition" is intended to mean a food composition that does not need to be diluted by e.g. a watery solution to be suitable for consumption. In principle, the ingredients present in the ready-to-eat food composition are balanced and no further ingredients such as e.g. herbs, spices, monosodium glutamate, or salt need to be added to the food composition to render it ready for consumption, as considered by a person skilled in the art.

The group of 3-hydroxy-2(H)-furanones comprises preferably the compounds sotolon (3-hydroxy-4,5-dimethyl-2(5H)-furanone) and abhexon (3-hydroxy-4-methyl-5-ethyl-2(5H)-furanone).

The group of volatile cyclic sulphur-containing compounds preferably comprises thiol-substituted methylfuranes, thiol-substituted methyl di/tetra-hydro furanes, or dithiolanes, preferably furfurylthiol (2 furan methanthiol) and 2-methyl-3-tetrahydrofuranthiol and 2-methyl-1,3-dithiolane. Furfurylthiol (2 furan methanthiol) is a preferred thiol-substituted methylfurane, 2-methyl-3-tetrahydrofuranthiol is a preferred thiol-substituted methyl di/tetra-hydro furane, 2-methyl-1,3-dithiolane is a preferred dithiolane.

Therefore, in a preferred aspect, the invention relates to the use as described above, wherein a) is represented by sotolon and/or abhexon and b) is represented by furfurylthiol and/or 2-methyl-3-tetrahydrofuranthiol and/or 2-methyl-1,3-dithiolane.

The present invention requires the use, addition or presence of at least one compound selected from a)-d) as mentioned above. This includes both the possibility that when more compounds are chosen, these compounds may be all chosen from one of the groups a)-d) and that they may be chosen each from anyone of a different group a)-d).

The compounds as mentioned above are as such known. They all have an aroma that can be described as a savoury/ bouillon, meaty and/or roasted note. For instance, sotolon (also known as sotolone, caramel furanone, sugar lactone and fenugreek lactone) is a lactone and a powerful aroma compound, with the typical smell of fenugreek or curry at high concentrations and bouillon, or in case of e.g. furaneol, maple syrup, caramel, or burnt sugar, at lower concentrations.

Despite their powerful aroma's it has now surprisingly been found that when applied in a relatively low concentration, the above mentioned compounds, used as a salt-replacing agent, may give a perception of saltiness to a ready-to-eat food composition or may at least enhance the perception of saltiness of a ready-to-eat food composition. Relatively low may be understood as more than 2 ppb, preferably more than 5 ppb, more preferably more than 10 ppb, most preferably more than 20 ppb and less than 1000 ppb, preferably less than 500 ppb, more preferably less than 200 ppb, most preferably less than 100 ppb, based on the weight of said food composition. This food composition preferably comprises a conventional salt, which may be present in a reduced amount, as compared with a comparable product on the market that is not reduced in its sodium-content. The concentration of the above mentioned compounds, used as a salt-replacing agent, is in the range of parts per billion in a ready-to-eat food composition.

As known, conventional salt does not have any aroma, and saltiness is experienced solely by taste. Without wishing to be bound by theory, it is believed that the perception of saltiness, as provided in the present invention, is mainly caused by the aroma of the compounds according to the invention and in a lesser extent to their taste, as experienced by the tongue. So, in the present invention, the consumer would experience a salty taste, or an enhanced salty taste, but actually this perception of saltiness may be caused by an aroma. In the rest of this specification, the "perception of saltiness" will be described as "salty flavour", which may comprise both the aroma as well as the taste of a compound as a source of the "perception of saltiness".

From the compounds tested, the effect of providing a salty flavour to a food composition appeared to be most clear when sotolon was used as a sodium-replacing agent. Therefore, in a preferred aspect, the invention relates to the use according to the present invention, wherein the at least one compound comprises sotolon.

Within the present specification, "sodium-replacing" agent does not mean that the compounds as described in the present invention should replace all sodium which is present in the food composition. It is intended, and even preferred, that the compounds described in the present invention and used as a sodium-replacing agent may also replace just part of the sodium content of a food composition and compensate for the omitted amount of sodium by adding a salty flavour.

The compounds as described above that may be used as a sodium-replacing agent may be applied in relatively low concentrations in a food composition.

Preferably, the concentration of each respective compound chosen from the group a) to d) may be from at least more than 1 ppb, preferably at least 2 ppb, more preferably more than 5 ppb, even more preferably more than 10 ppb, most preferably more than 20 ppb and preferably less than 500 ppb, more preferably less than 200 ppb, most preferably less than 100 ppb.

In a preferred aspect, the food composition still comprises sodium, be it preferably in a reduced amount. It was found, that a specific weight ratio between sodium present in the food composition and the total of sodium-replacing compounds appeared to give optimal results. This ratio was between 2,000 and 5,000,000. Therefore, in a preferred aspect, the invention relates to the use wherein said food composition comprises $Na^+$, wherein the weight ratio of $Na^+$ to said at least one compound is smaller than 5,000,000, preferably smaller than 3,000,000 more preferably smaller than 2,000,000, more preferably smaller than 1000000, more preferably smaller than 500000, most preferably smaller than 250000 and higher than 2000, preferably higher than 5000, preferably higher than 10000, more preferably higher than 20000 most preferably higher than 50,000.

In a further aspect, the present invention relates to a method to reduce the $Na^+$ content of a food composition, comprising the step of replacing at least part of the $Na^+$ content by at least one of the following compounds during and/or after preparation of said food composition:
  a) 3-hydroxy-2(H)-furanones, preferably, 3-hydroxy-4,5-dialkyl-2(H)furanones,
  b) thiol-substituted methylfuranes or thiol-substituted methyl di/tetra-hydro furanes, preferably furfurylthiol or 2-methyl-3-tetrahydrofuranthiol,
  c) furfuryl alcohol
  d) bis(2-methyl-3-furanyl)disulphide,
wherein the total amount of said at least one compound is from at least more than 2 ppb, preferably more than 5 ppb, more preferably more than 10 ppb, most preferably more than 20 ppb and less than 1000 ppb, preferably less than 500 ppb, more preferably less than 200 ppb, most preferably less than 100 ppb, based on the weight of said food composition.

In a further aspect, the invention preferably relates to a method wherein a) is represented by sotolon and/or abhexon, and wherein b) is represented by furfurylthiol, 2-methyl-3-tetrahydrofuranthiol and 2-methyl-1,3-dithiolane.

In a more preferred aspect, the invention relates to a method wherein the at least one compound comprises sotolon.

Preferably, the amount of each respective compound chosen from a) to d) may be from at least more than 1 ppb, preferably at least 2 ppb, more preferably more than 5 ppb, even more preferably more than 10 ppb, most preferably more than 20 ppb and preferably less than 500 ppb, more preferably less than 200 ppb, most preferably less than 100 ppb.

In yet another aspect, the invention relates to a method, wherein the at least one compound is mixed with a food composition comprising $Na^+$, wherein the weight ratio of $Na^+$ to said at least one compound is smaller than 5,000,000, preferably smaller than 3,000,000 more preferably smaller than 2,000,000, more preferably smaller than 1000000, more preferably smaller than 500000, most preferably smaller than 250000 and higher than 2000, preferably higher than 5000, preferably higher than 10000, more preferably higher than 20000 most preferably higher than 50,000.

Preferably, by the present method 0.1 wt. % to 75 wt. % of the original sodium content of the food composition is replaced. Preferably at least 5 wt. %, more preferably at least 10 wt. and less than 50 wt. %, preferably less than 35 wt. % of the original sodium content of the food composition is replaced.

The compounds used as a sodium replacing agent or used in the method to reduce the $Na^+$ content of a food composition are preferably used in savoury food compositions. Savoury food compositions may be e.g. non-sweet tasting compositions, or compositions with a umami taste. The food compositions according to the invention may be in a liquid or in a solid state. The food composition according to the invention is not limited to a ready-to-eat food composition; a concentrated product is not excluded from the scope of the present invention, as will be substantiated below.

Therefore, in a further aspect, the invention relates to a ready-to-eat food composition comprising at least one of the following compounds:
 a) 3-hydroxy-2(H)-furanones, preferably, 3-hydroxy-4,5-dialkyl-2(H)furanones, not being abhexon,
 b) thiol-substituted methylfuranes, thiol-substituted methyl di/tetra-hydro furanes, or dithiolanes, preferably furfurylthiol, 2-methyl-3-tetrahydrofuranthiol or 2-methyl-1,3-dithiolane,
 c) furfuryl alcohol
 d) bis(2-methyl-3-furanyl)disulphide,
wherein the amount of the at least one compound is higher than 5 ppb, preferably higher than 7 ppb, more preferably higher than 12, more preferably higher than 15 ppb, and less than 500 ppb, more preferably less than 200 ppb, even more preferably less than 100 ppb, most preferably less than 50 ppb, based on the weight of said ready-to-eat food composition.

The food composition comprises $Na^+$ in an amount of more than 10 mg per 100 g and less than 1200 mg per 100 g, based on the weight of the food composition.

Within the described range indicated above, the preferred amounts may vary for the respective compounds mentioned in the present invention. Sotolon is preferably used in an amount of from 15 ppb, preferably 20 ppb, to 35 ppb, preferably 30 ppb. Abhexon is preferably used in an amount of from 15 ppb, preferably of from 10 ppb to ppb, preferably to 20 ppb. Furfurylthiol is preferably used in an amount of from 10 ppb to 20 ppb. And 2-methyl-3-tetrahydrofuranthiol is preferably used in an amount of from 45-55 ppb.

However, also a combination of more sodium-replacing agents can be used in a ready-to-eat food composition, as became clear form the previous aspects of the invention. Therefore, in a further aspect, the invention relates to a ready-to-eat food composition comprising at least two of the following compounds:
 a) 3-hydroxy-2(H)-furanones, preferably, 3-hydroxy-4,5-dialkyl-2(H)furanones, not being abhexon,
 b) thiol-substituted methylfuranes, thiol-substituted methyl di/tetra-hydro furanes, or dithiolanes, preferably furfurylthiol, 2-methyl-3-tetrahydrofuranthiol or 2-methyl-1,3-dithiolane,
 c) furfuryl alcohol
 d) bis(2-methyl-3-furanyl)disulphide,
wherein the total amount of said at least two compounds is at least 6 ppb, preferably at least 10 ppb, more preferably at least 12 ppb, most preferably at least 15 ppb, and less than 500 ppb, more preferably less than 200 ppb, even more preferably less than 100 ppb, most preferably less than 50 ppb, based on the weight of the ready-to-eat food composition.

In yet another aspect, the present invention relates to a ready-to-eat food composition further comprising $Na^+$ in a concentration of at least 10 mg per 100 g of said ready-to-eat food composition and wherein the weight ratio of $Na^+$ to said one compound or said at least two compounds taken together is smaller than 5,000,000, preferably smaller than 3,000,000 more preferably smaller than 2,000,000, more preferably smaller than 1000000, more preferably smaller than 500000, most preferably smaller than 250000 and higher than 2000, preferably higher than 5000, preferably higher than 10000, more preferably higher than 20000 most preferably higher than 50,000.

It becomes clear from the above paragraph, that the concentrations of the salt-replacing compounds may be higher than the indicated preferred maximum levels. The ratio between the $Na^+$ content and the total amount of salt replacing compounds taken together however should preferably remain in the indicated range. A product in a concentrated form may still show a range as indicated above.

In a preferred aspect, the invention relates to a ready to eat food composition according to the invention, wherein a) is represented by sotolon, and wherein b) is represented by furfurylthiol or 2-methyl-3-tetrahydrofuranthiol and 2-methyl-1,3-dithiolane.

Preferably, when at least one sodium replacing compound is present in the ready-to-eat food composition according to the invention, this compound is sotolon, and, alternatively, when more than one sodium replacing compound is present in the ready-to-eat food composition, at least sotolon is present.

Therefore, in a preferred aspect, the invention relates to a ready-to-eat food composition wherein said at least one compound or said at least two compounds comprise sotolon.

Preferably, when two or more sodium replacing compounds are present in the ready-to-eat food composition, at least one of them is present in an amount higher than 5 ppb. Therefore, in an other preferred aspect, the invention relates to a ready-to-eat food composition according to the invention, wherein at least one of said at least two compounds is present in an amount of higher than 5 ppb, preferably at least 7 ppb, more preferably at least 12 bbp, most preferably at least 15 ppb. Preferably, this at least one compound is sotolon.

Preferably, when two or more sodium replacing compounds are present in the ready-to-eat food composition, each of the at least two compounds is present in an amount of higher than 5 ppb, preferably at least 7 ppb, more preferably at least 12 ppb, most preferably at least 15 ppb.

As indicated above, the ready-to-eat food composition according to the invention may be in a solid state or in a liquid state. Solid food compositions may comprise e.g. a meal, an instant meal or a chilled or frozen meal, that has to be heated before consumption, but also an instant food compositions such as e.g. dehydrated and/or dry soups, bouillons, sauces, as more specified below, or dry taste enhancers that may e.g. be used for seasoning purposes. When sodium replacing compounds are used in liquid ready-to-eat food compositions, these ready-to-eat food compositions are preferably soups, meal sauces or table sauces. The (liquid) ready-to-eat food composition may be packaged in e.g. a can, a pouch, a tetra-pack or a jar.

In a preferred aspect of the invention, the ready-to-eat food composition is a soup. A soup is intended to comprise a liquid food composition that is preferably essentially ready for consumption, and no further ingredients need to be added to arrive at a ready-to-eat food composition that is considered ready-to-eat by the skilled person or the average consumer. To this end, a liquid product which is not ready for consumer consumption yet, such as a mere extract form meat or fish etc., without further seasoning with e.g. herbs, spices, monosodium glutamate or salt is not considered as a soup in the present context. Preferably, a soup in the context of the invention is prepared by using from 0.1 wt. % to 5 wt. % herbs and spices. Preferably it comprises from 0.1 wt. % to 5 wt. % herbs and spices. Herbs may be e.g. thyme, rosemary, oregano, chives, parsley, etc. In addition, vegetables may be present in an amount of from 0.1 to 5%. Vegetables may be e.g. onion, carrot, celery, etc. For a vegetable soup, the amount of vegetables may be higher. A soup according to the invention may comprise meat, vegetables, fruits, poultry, fish, herbs and seasoning. The flavours of its ingredients may be extracted in the liquid mass. A soup is further intended to mean in the present context a ready-to-eat bouillon, consommé, bisque, velouté, gulash, gazpacho, etc. It may be consumed warm, but also cold soups are imaginable, such as e.g. gazpacho's. A soup may be either a clear soup, as a bouillon, or a thick or creamy soup. In the context of the present invention, the preferred sodium content of a soup may be preferably from 0 to 450 mg per 100 g of the soup. Therefore, in a preferred aspect the invention relates to a ready-to-eat food composition according to the invention, wherein the ready-to-eat food composition is a soup and wherein the amount of $Na^+$, is higher than 0 mg, preferably at least 10 mg, more preferably at least 20 mg, most preferably at least 50 mg, and less than 450 mg, preferably less than 400 mg, more preferably less than 300 mg, most preferably less than 200 mg per 100 g ready-to-eat food composition and wherein at least one of the compounds is present in an amount of at least 2 ppb, preferably at least 5 ppb, more preferably at least 7 ppb, even more preferably at least 12 ppb, and most preferably at least 15 ppb.

In a further aspect of the present invention, the ready-to-eat food composition is a meal sauce. A meal sauce differs from a soup in that it is in general not eaten as a complete dish, but is eaten in combination with another food product, such as e.g. meat (e.g. beef, fish or chicken), rice, potatoes, vegetables or pasta. A meal sauce is used to function as part of the meal, rather than either being the meal itself, as is the case with e.g. a soup, or as a way to add a specific taste to a meal (see table sauce, below). The consistency may be thicker than that of a soup. A meal sauce can be poored over the whole meal, or over components of the meal. Furthermore, Components of the meal, such as meat, fish, beans, rice, potatoes, pasta etc, can be prepared in the meal sauce, together forming a meal or at least a substantial part of it. Examples of a meal sauce in the present context are e.g. a pasta sauce such as e.g. a pasta sauce based on tomatoes or cheese, a ragout, pepper sauce, champignon sauce, stroganoff sauce, béchamel sauce etc. In the context of the present invention, the preferred sodium content of a meal sauce may be preferably from 0 to 650 mg per 100 mg of the meal sauce. Therefore, in a preferred aspect, the invention relates to a a ready-to-eat food composition according to the invention, wherein the ready-to-eat food composition is a meal sauce and wherein the amount of $Na^+$, is higher than 0 mg, preferably at least 10 mg, more preferably at least 20 mg, most preferably at least 50 mg and less than 650 mg, preferably less than 550 mg, more preferably less than 400 mg, most preferably less than 300 mg per 100 g ready-to-eat food composition.

In a further aspect of the present invention, the ready-to-eat food composition is a table sauce. A table sauce differs from a soup and a meal sauce in that a table sauce does in general not form a substantial part of the meal. In general, its consistency may be thicker than that of a soup and of a meal sauce. A table sauce may add a specific flavour to e.g. a meal, parts of a meal or to sauces, including meal sauces. Apart from being mixed into a meal, a table sauce may also suitably be used besides the meal to dip parts of the meal in it, such as in the case of dip-sauces. Table sauces may be used in general in a relatively small amount, as for reasons of taste or health (fat content) it may be not desired to eat large quantities of it in a single meal. The taste of a table sauce may therefore be relatively strong, compared to a meal sauce. Examples of table sauces are e.g. tomato ketchup, mayonnaise, curry sauce or mustard. The sodium content of a table sauce may be from e.g. 0-1200 mg per 100 g table sauce. Therefore in a preferred aspect, the invention relates to a ready-to-eat food composition according to the invention, wherein the ready-to-eat food composition is a table sauce, and wherein the amount of $Na^+$, is higher than 0 mg, preferably at least 10 mg, more preferably at least 20 mg, most preferably at least 50 mg and less than 1200 mg, preferably less than 1000 mg, more preferably less than 800 mg, most preferably less than 600 mg per 100 g ready-to-eat food composition.

Other ingredients that may be present in the ready-to-eat food compositions as mentioned above are e.g. mono-sodium glutamate, starch, sugar, and/or herbs and spices. Monosodium glutamate may be present in an amount of at least 0.05 wt. %, preferably at least 0.1 wt. % and less than 1 wt. %, preferably less than 0.6 wt. %, based on the weight of the ready-to-eat food composition. Starch may be present in an amount of at least 0.03 wt. %, preferably at least 0.1 wt. % and less than 0.5 wt. %, preferably less than 0.3 wt. %, based on the weight of the ready-to-eat food composition. Herbs and spices may be present in an amount of e.g. from 0.1 wt % and less than 5 wt %, based on the weight of the ready-to-eat food composition.

The present invention further relates to a concentrated food composition. Concentrated means that the ingredients have a higher concentration than in a ready-to-eat food composition. It may be produced by e.g. concentration of a ready-to-eat food composition, by e.g. dehydration of it, or by preparing the composition as such from its individual ingredients. It is clear for a person skilled in the art, that in a concentrated food composition the concentrations as indicated in the specification above should be higher, in such an extent as the concentrated composition should be diluted to provide a ready-to-eat composition. When for example a bouillon cube of 5 grams is prepared that should be diluted in 500 ml of liquid, the concentrations of the ingredients, such as the salt-replacing compounds, mentioned above should be multiplied by 100. Directions to the consumer how to prepare a ready-to-eat food composition starting from a concentrated food composition, e.g. by diluting the concentrated food composition with water or dissolving it in water, are normally indicated and/or recommended on the packaging of the concentrated food-composition. The dilution rate recommended for concentrated food compositions may vary between several types of concentrated food compositions. A dilution rate of from 0.1 to 500 by weight of the concentrated food composition is preferred.

Therefore, in a further aspect, the invention relates to a packaged concentrated food composition, wherein the concentrated food composition after mixing with an aqueous solution according to the recommendation on the packaging results in a ready-to-eat food composition according to the invention. The ratio of $Na^+$ to the at least one compound a)-d) is higher than 10000. When the at least one compound is 1,3-dithiolane or 2-methyl-1,3-dithiolane or 3-methyl-1,2-dithiolane, the concentrated food composition comprises at least one lower alkaline metal salt, preferably NaCl in a concentration of at least 12 wt % and less than 70 wt %.

Preferably the ratio of $Na^+$ to the at least one compound a)-d) is higher than 20000, preferably higher than 50000, and preferably smaller than 5000000, more preferably smaller than 3000000 even more preferably smaller than 2000000, even more preferably smaller than 1000000, even more preferably smaller than 500000, and most preferably smaller than 250000.

Preferably, the aqueous solution is water.

Preferably, the invention relates to a concentrated food composition wherein at least one lower alkaline metal salt, preferably NaCl, is present in a concentration of at least 10 wt. %, preferably at least 15 wt %, more preferably at least 20 wt % most preferably at least 25 wt % and less than 70 wt. %, preferably less than 60 wt %, more preferably less than 50 wt %, most preferably less than 40 wt %, and wherein monosodium glutamate is present in an amount of from at least 5 wt % and less than 45 wt % and wherein starch is present in an amount of at least 2 wt. % and less than 15 wt. %, based on the weight of the concentrated food composition. Starch may be both modified and unmodified starch, and is intended to comprise also hydrolysed starch, such as maltodextrins.

Preferably, the invention relates to a concentrated food composition wherein said concentrated food composition is a bouillon tablet or a dry soup or dry seasoning composition. The bouillon tablet may have any form (e.g. cube, rectangular, ball, rod-shaped) and is produced by e.g. pressing of its ingredients or by extrusion of the ingredients into the desired form. The bouillon tablet may be dry, a past or a gel, or a combination thereof. The bouillon tablet may also have a jelly appearance. The dry soup or dry seasoning composition may be in the form of a powder or granules. In the present context, dry is intended to mean having a moisture content of less than ca. 10 wt. %.

The invention will be exemplified by the following examples:

EXAMPLES

Example 1

Effect of Aroma Compounds on Perceived Saltiness Using an Untrained Panel

The effect of aroma compounds on saltiness was tested in a chicken bouillon with 30% reduced salt content ("NaCl 70%", 335 mg/100 g total $Na^+$, in this example). The composition of the bouillon is given in table 1.

TABLE 1

| Composition of the bouillons (g/l) | | | |
|---|---|---|---|
| | Standard | NaCl 70% | NaCl 90% |
| NaCl | 7.6 | 5.2 | 6.8 |
| MSG | | 2.0 | |
| Ribotides | | 0.07 | |
| Starches/maltodextrins | | 2.6 | |
| Sugars | | 2.3 | |
| Protein | | 0.6 | |
| Fat | | 1.0 | |
| Citric acid | | 0.4 | |
| Yeast extract | | 0.3 | |
| Chicken flavours | | 1.2 | |
| Onion powder | | 0.1 | |

A naïve panel was composed of 5-12 untrained subjects. All panelists were tested on taste sensitivity, mainly focused on salt. Taste sessions took place in a sensory room with individual booths. The sessions were once every two weeks in order to avoid training the panel. Samples were served at ~60° C. in a 50 ml medicinal cup. Test samples were prepared by adding several concentrations of a "sodium replacing compound" according to the invention (furfurylthiol, sotolon, abhexon, 2-methyl-3-tetrahydrofuranthiol, furfuryl alcohol) to the bouillon containing 70% NaCl.

In addition to the test samples, two controls were presented, one of a bouillon with 70% NaCl and one of a bouillon with 90% NaCl, both without a "sodium replacing compound", as a reference for the panel lists, fixing the scale and helping them to score more accurately. The "salt intensity" was scored on a 12-points scale.

Saltiness Enhancement by Furfurylthiol, Sotolon, Abhexon and 2-methyl-3-tetrahydrofuranthiol In Table 2 one can see a difference of salt perception between the control without "sodium replacing compound" and the sample with furfurylthiol at 15 ppb. A difference of salt perception can be seen in Table 2 between the control without "sodium replacing compound" and the sample with sotolon at 20 ppb and 30 ppb. Interpolation of the reference scores suggests that the sample with 30 ppb sotolon scores equal to ~85% NaCl. In other words, up to 15% salty taste enhancement appears feasible with this compound on its own. Moreover, it is important to note that the flavour profile of this product is not perceived as changed at this concentration. Table 2 further shows a difference of salt perception between the control without "sodium replacing compound" and the sample with abhexon at 10 ppb and 20 ppb. A difference of salt perception between the control without "sodium replacing compound" and the sample with 2-methyl-3-tetrahydrofuranthiol is shown for an amount of 50 ppb.

TABLE 2

Saltiness perception at 70% NaCl with furfurylthiol, sotolon, abhexon, 2-methyl-3-tetrahydrofuranthiol present

| Compound | Average |
|---|---|
| NaCl 70% + 15 ppb Furfurylthiol | 7.14 |
| NaCl 70% + 20 ppb Sotolon | 6.57 |
| NaCl 70% + 30 ppb Sotolon | 7.85 |
| NaCl 70% + 10 ppb Abhexon | 5.83 |
| NaCl 70% + 20 ppb Abhexon | 5.67 |
| NaCl 70% + 50 ppb 2-Methyl-3-tetrahydrofuranthiol | 7.6 |
| Control NaCl 70% | 2 |
| Control NaCl 90% | 10 |

Example 2

Effect of Sotolon on Consumer-Perceived Saltiness

A two-Alternative Forced Choice test is used to investigate the difference between two samples on a specified attribute (in this case saltiness). The bouillon context was similar as that used in the previous example: 70% NaCl and 70% NaCl+ 40 ppb sotolon. Consumers were allowed to taste back the samples.

Out of 33 assessors, 23 perceived the sample with 40-ppb sotolon as being saltier than the salt-reduced product without sotolon. For α=0.05 (confidence level), the sample with sotolon is perceived significantly saltier than without.

The invention claimed is:
1. Method to reduce the $Na^+$ content of a food composition, characterised in that it comprises the step of replacing at least part of the $Na^+$ content with a compound, which is one or more 3-hydroxy-2(H)-furanones during and/or after preparation of said food composition,
   wherein the total amount of said compound is from at least more than 2 ppb and less than 1000 ppb based on the weight of said food composition,
   wherein the compound is mixed with a food composition comprising $Na^+$,
   wherein the weight ratio of $Na^+$ to the 3-hydroxy-2(H)-furanones is from 10,000 to 2,000,000.
2. Method according to claim 1, characterised in that the compound is sotolon and/or abhexon.
3. Method according to claim 1, characterised in that the compound comprises sotolon.

* * * * *